(12) United States Patent
Isaacson et al.

(10) Patent No.: US 12,165,164 B1
(45) Date of Patent: *Dec. 10, 2024

(54) SYSTEM AND METHOD FOR IMPLEMENTING A SYSTEM EXECUTION DELAY IN RESPONSE TO LIQUIDITY REMOVAL FOR RESTING ORDERS

(71) Applicant: Cboe Exchange, Inc., Chicago, IL (US)

(72) Inventors: Christopher Andrew Isaacson, Olathe, KS (US); Eric Crampton, Overland Park, KS (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,012

(22) Filed: Jun. 27, 2023

Related U.S. Application Data

(63) Continuation of application No. 17/162,959, filed on Jan. 29, 2021, now Pat. No. 11,727,421.

(60) Provisional application No. 63/080,983, filed on Sep. 21, 2020.

(51) Int. Cl.
*G06Q 30/02* (2023.01)
*G06Q 30/0202* (2023.01)
*G06Q 40/04* (2012.01)

(52) U.S. Cl.
CPC ......... *G06Q 30/0202* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 4,412,287 A | 10/1983 | Braddock, III | |
| 6,618,707 B1 | 9/2003 | Gary | |
| 7,158,951 B2 | 1/2007 | Stark | |
| 7,379,909 B1 | 5/2008 | Cruz et al. | |
| 7,483,854 B2 | 1/2009 | Liu | |
| 7,644,027 B2 | 1/2010 | Keith | |
| 7,685,044 B1 | 3/2010 | Robertson et al. | |
| 7,921,054 B2 | 4/2011 | Balabon | |
| 8,055,574 B2 | 11/2011 | Cutler et al. | |
| 8,165,954 B2 | 4/2012 | Waelbroeck et al. | |
| 8,527,391 B2 | 9/2013 | Siverson et al. | |
| 8,630,934 B2 | 1/2014 | Altius | |
| 8,639,902 B2 | 1/2014 | Jeddeloh | |
| 8,706,608 B2 | 4/2014 | Bok et al. | |

(Continued)

OTHER PUBLICATIONS

U.S. Appl. No. 17/162,818, filed Jan. 29, 2021.

*Primary Examiner* — Jamie H Austin
(74) *Attorney, Agent, or Firm* — Crowell & Moring LLP

(57) ABSTRACT

A system and method for managing latency of messages in an exchange system in response to removal of liquidity are disclosed. In one implementation, the system may include an exchange system, and a set of instructions to cause a processor of the exchange system to gather information on quote patterns. The monitored quote patterns are assessed against quote parameters maintained in system memory, and a latency adjustment is automatically made to delay messages from particular market participants removing liquidity in the exchange system. Market participants may be identified as aggressive market participants, and their subsequent liquidity removing orders delayed, based on predetermined quote pattern parameters.

11 Claims, 5 Drawing Sheets

(56) References Cited

U.S. PATENT DOCUMENTS

| | | |
|---|---|---|
| 8,751,363 B2 | 6/2014 | Cushing et al. |
| 9,881,338 B2 | 1/2018 | Schmitt et al. |
| 10,002,385 B2 | 6/2018 | Renton et al. |
| 10,127,612 B2 | 11/2018 | Mannix |
| 10,127,615 B1 | 11/2018 | Givot |
| 10,163,157 B2 | 12/2018 | Crowley |
| 10,185,993 B2 | 1/2019 | Katsuyama et al. |
| 10,303,530 B1 | 5/2019 | Givot et al. |
| 10,325,317 B2 | 6/2019 | Melton |
| 10,346,910 B2 | 7/2019 | Katsuyama et al. |
| 10,346,918 B2 | 7/2019 | Schmitt et al. |
| 2002/0156719 A1 | 10/2002 | Finebaum et al. |
| 2005/0102220 A1 | 5/2005 | Stackpole |
| 2006/0089898 A1* | 4/2006 | Durkin .................. G06Q 40/04 705/37 |
| 2009/0076961 A1 | 3/2009 | Waelbroeck |
| 2012/0271745 A1 | 10/2012 | Buck |
| 2015/0066727 A1 | 3/2015 | Wepsic et al. |
| 2015/0073967 A1 | 3/2015 | Katsuyama et al. |
| 2016/0035027 A1 | 2/2016 | Mercer et al. |
| 2018/0060146 A1* | 3/2018 | Millhuff ................ G06Q 40/04 |
| 2018/0183901 A1 | 6/2018 | Lariviere |
| 2019/0172133 A1* | 6/2019 | Noviello ............... G06Q 40/00 |
| 2021/0049691 A1* | 2/2021 | Howorka ............... G06Q 40/04 |

\* cited by examiner

SYSTEM AND METHOD FOR IMPLEMENTING A SYSTEM EXECUTION DELAY IN RESPONSE TO LIQUIDITY REMOVAL FOR RESTING ORDERS

CROSS-REFERENCE TO RELATED APPLICATIONS

This application is a continuation of U.S. application Ser. No. 17/162,959, filed Jan. 29, 2021, pending which claims the benefit of U.S. Provisional Application Ser. No. 63/080,983, filed Sep. 21, 2020, wherein the entirety of each application is hereby incorporated herein by reference.

FIELD OF THE DISCLOSURE

The present disclosure relates to the trading of financial products. More specifically, the present disclosure relates to aspects of automatically adjusting system response times in a financial trading system.

BACKGROUND

A derivative is a financial security whose value is based, at least in part, on a value or characteristic of an underlying asset. Two exemplary and well-known derivatives are options and futures.

An option is a contract that gives the contract holder a right, but not an obligation, to buy or sell an underlying asset at a specific price on or before a certain date. Generally, a party who purchases an option is referred to as the holder of the option and a party who sells an option is referred to as the writer of the option.

There are generally two types of options: call and put options. A holder of a call option receives a right to purchase an underlying asset at a specific price, i.e., the "strike price." If the holder exercises the call option, the writer is obligated to deliver the underlying asset to the holder at the strike price. Alternatively, the holder of a put option receives a right to sell an underlying asset at a strike price. If the holder exercises the put option, the writer is obligated to purchase the underlying asset at the agreed upon strike price. When settlement includes the transfer of an underlying asset, the settlement is often referred to as physical settlement or in kind settlement. However, an underlying asset of an option need not be tangible and/or transferable property.

Options may also be based on more abstract market indicators, such as stock indices, interest rates, futures contracts, and other derivatives. In these cases, physical settlement may not be desired and/or possible. When physical settlement is not desired and/or preferred, contracts may be "cash settled." That is, rather than transferring the underlying asset, a cash payment is made to settle the contract. For example, using cash settlement, a holder of an index call option receives the right to "purchase" not the index itself, but rather a cash amount based on the value of the index multiplied by a multiplier, e.g., $100. For example, if a holder of an index call option exercises the option, the writer of the option must pay the holder the difference between the current value of the underlying index and the strike price multiplied by the multiplier.

Similar to options contracts, futures contracts may also be based on abstract market indicators. Futures contracts give a buyer of the future an obligation to receive delivery of an underlying commodity or asset on a fixed date in the future. Accordingly, a seller of the future contract is obligated to deliver the commodity or asset on the specified date for a given price.

Although futures contracts generally confer an obligation to physically deliver an underlying asset on a specified delivery date, the actual underlying asset need not change hands. Instead, futures contracts, like options contracts, may be cash settled. To cash settle a futures contract, the difference between a market price and a contract price of an underlying asset is paid by one investor to the other. Again, like options, cash settlement allows futures contracts to be created based on more abstract assets, such as market indices. To cash settle index futures, the difference between the contract price and the price of the underlying index (i.e., current value of market index) is exchanged between the investors. Derivatives such as options and futures may be traded over-the-counter ("OTC"), and/or on other trading facilities such as organized exchanges (e.g., Chicago Board Options Exchange Incorporated (CBOE)). OTC transactions are bilateral in nature and individual parties to a transaction are free to customize each transaction as they see fit. Platform-traded derivatives, such as exchange traded derivatives, are standardized and are settled using a clearing corporation that acts as an intermediary when a contract is exercised.

Electronic trading systems that handle and process quotes and orders for derivatives are utilized by different types of market participants, for example, traders and market-makers. Traders are investors or professionals who make purchases and sales. Market-makers are exchange members who provide liquidity in the marketplace by risking their own capital in making bids and offers for their own accounts in the absence of public buy or sell orders. Several market-makers are normally assigned to a particular security. For an exchange to run effectively, there needs to be liquidity in the form of a steady availability of quotes and orders for each of the different securities. To provide liquidity to an exchange, certain participants, for example market-makers, typically have several quoting obligations that need to be maintained on a regular basis so that incoming orders have a functioning two-sided market. Unfortunately, certain trading patterns and actions of high-speed counterparties attempting to execute against market-maker quotes before the market-maker can move them all during a market movement may reduce available liquidity in a manner that can prevent effective operation and processing of electronic order flow of the exchange as a whole.

SUMMARY

Methods and systems for automatically detecting and responding to trading patterns of market participants against market-maker quotes that reduce liquidity are provided herein. In one implementation, the exchange system detects a problematic trading pattern that removes liquidity and initiates a communication delay on quotes and/or orders originating from at least one market participant. The communication delay may be lifted after a predetermined period of time, or when liquidity criteria have been reestablished or resolved. Messaging between the exchange system and the system of the market-maker may be provided to alert the market-maker of a triggered message delay function that delays message communication speed relating to quote and/or order messages for that market-maker.

DETAILED DESCRIPTION

Figure 1:
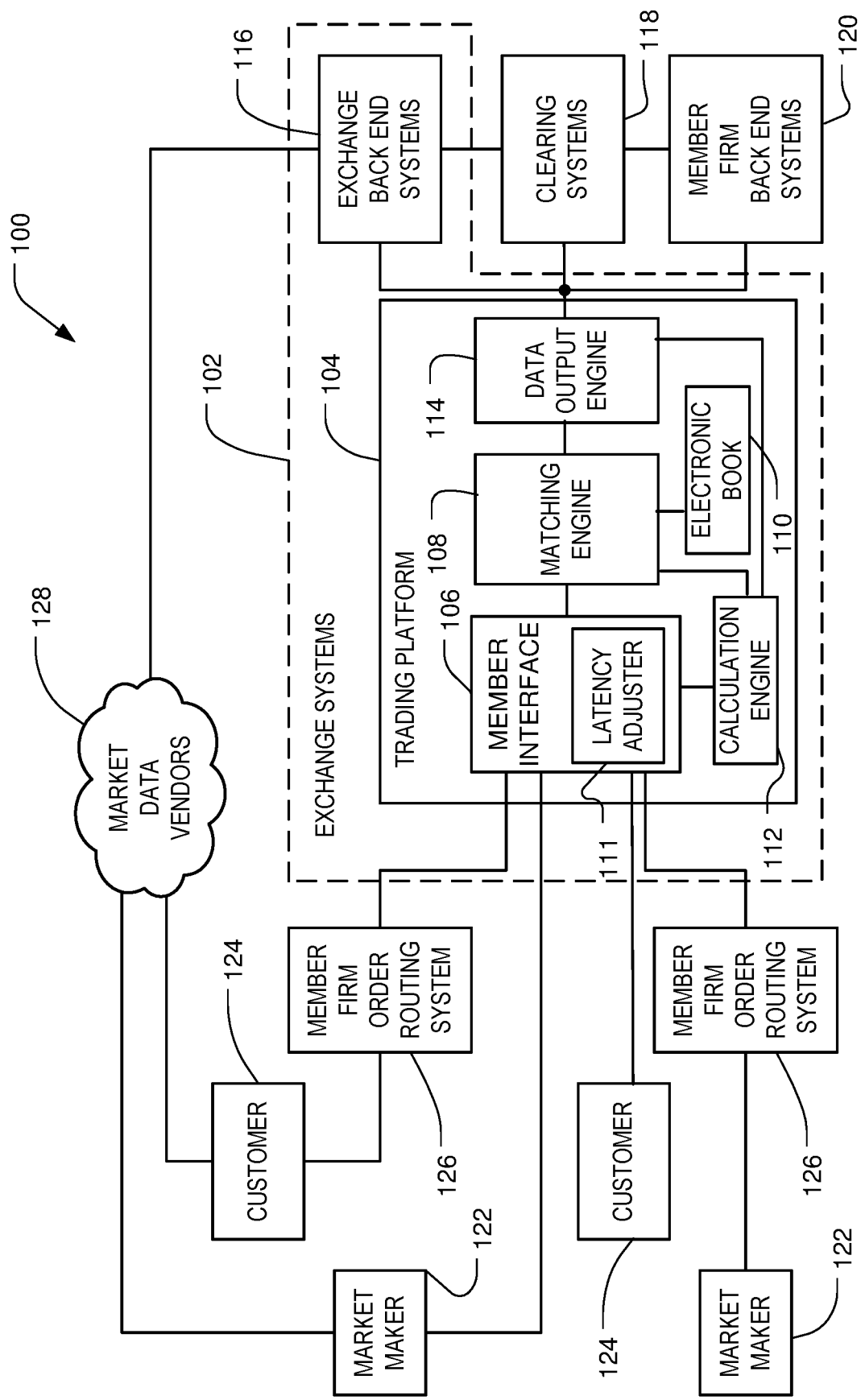
FIG. 1 is a block diagram of an exemplary financial trading system that may be used to implement an embodiment of the present invention.

The present disclosure is directed to methods and systems related to the control of order flow in an electronic trading system that can prevent order flow patterns that reduce liquidity in a market. Trading patterns may be monitored at random or predetermined intervals, in both real and non-real time, to identify when a pattern of trading by any market participant indicates an unacceptable or disruptive level of liquidity removal. The types of trading patterns monitored may be, for example, when a market-maker quotes at, above, or below a predefined percentage of the series in which it is registered for a predefined percentage of each trading day, or, alternatively, when a market-maker quotes a percentage of appointed classes that meets, exceeds, or falls below requirements that it enters quotes aggregating a predefined percentage of the cumulative seconds across the total seconds that its appointment classes are open for trading. Order processing delays are automatically generated and applied to trading sources identified as disrupting trading activity patterns predetermined as required by the trading system. These order processing delays may be of either fixed or variable duration. The order processing delays maybe specifically directed to liquidity removal orders. In alternative embodiments, application of the order processing delays may include warning messaging to affected parties, or the delays may be applied in varying levels based on the degree of market-maker compliance with its requirements or the severity of the liquidity removal pattern detected.

Trading patterns that identify an aggressive market participant may be determined from monitored trade patterns and automatically acted upon by the electronic trading system to apply order processing delays directed to the identified aggressive market participant(s). An aggressive market participant is a market participant whose trading patterns are determined to remove liquidity from the market in a manner detrimental to maintaining regular order flow and available liquidity to the market generally. For purposes of this disclosure, liquidity removal may be defined by any order that immediately takes contracts, shares, or the like from a bid or ask that is at the market at the time the order is entered. As one example, market participants entering a pattern of market orders to buy or sell for immediate execution at a current national best bid or offer (NBBO) price offered by other market participants may be identified as aggressive market participants. A liquidity removal order on a buy side may be an order at or above the ask price and a liquidity removal order on the sell side may be an order at or below the bid price, where an immediate match would be made with a contra order.

More specifically, for purposes of this disclosure, an aggressive market participant is one that has removed liquidity from the electronic market place in a manner that aligns with one or more predetermined parameters. For example, the predetermined parameters may include a trade pattern of at least X trades for immediate execution at the current price (similar to the order type known as a market order) within Y period of time. Suitable parameters include markouts over X period of time showing the liquidity remover is consistently adversely selecting the MM quote/order to their benefit. The parameters may also include an amount of total liquidity removed, for an individual trade or in aggregate over the Y time period. Another behavior indicating an aggressive market participant includes large orders (multiple times the size of the displayed quote size for a MM at the exchange) at one or more price levels where the participant is removing all liquidity at the one or more price levels, followed by a market move in the participants favor.

In one alternative embodiment, because the market participants that tend to need protection from aggressive market participants are typically market-makers, the electronic exchange system may also track market-maker trade patterns generally to see which market-makers may be eligible for protection from aggressive market participants, or to what degree. A predetermined market-maker trading pattern may be a quote or order update rate required by a market-maker that is associated with the electronic trading system. For example, one trading pattern that the electronic trading system for the trade of derivatives may monitor is the continuous quoting obligation of market-makers in their respective assigned series class. The continuous quoting obligation refers to, for the specific underlying instrument series assigned to that particular market-maker, the requirement that the market-maker stand ready to buy and sell a particular security on a regular and continuous basis at a publicly quoted price. In this alternative embodiment, the application of the automatic order processing delays to aggressive market participants may be adjusted based on whether the market-maker trade patterns have been meeting the required continuous quoting obligation for the exchange.

Any of a number of parameters may be assigned to a continuous quoting obligation. As one example, a market-maker continuous quoting requirement managed by an electronic trading system may include parameters of a predefined percentage of the series in which the market-maker is registered for predefined percentage of each trading day, or, alternatively, a requirement that the market-maker enters quotes aggregating a predefined percentage of the cumulative seconds across the total seconds that its appointment classes are open for trading. Other parameters may include a minimum volume (number of contracts) that must be included on each side of a two-sided quote, where the two-sided quote includes a bid price (what the market-maker will pay to buy a contract) and an ask price (also referred to as offer price: what the market-maker will sell the contract for). The continuous quoting parameters may also include the amount of time that the electronic trading system requires the market-maker to keep a given quote available before withdrawing or updating the quote.

The continuous quoting parameters may also include a total percentage of time of a predetermined trading period, for example the percentage of time during trading hours for a day, a week, or a month, that the market-maker must maintain quotes that meet the minimum requirements. The percentage of time parameters could be just for one period, such as a daily parameter of a predefined percentage (for example, 60%) of the series in which it is registered for a predefined percentage (for example, 90%) of each trading day, or any percentage of appointed classes so long as the market-maker enters quotes aggregating a predefined percentage (for example, 60%) of the cumulative seconds across the total seconds that its appointment classes are open for trading. These time parameters may further include both daily requirements of a predefined percentage of quote availability in addition to weekly and/or monthly percentage quote availability parameters that may be the same or different than each other. Thus, a quoting obligation is set according to predetermined time continuity parameters by the electronic trading system. Given that quotes from market-makers are stored electronically in an order book and can be tracked according to continuous quoting parameters for the electronic exchange, such as those identified above, the electronic trading system can actively track the quoting pattern of a market-maker to verify that the market-maker is quoting at a level that meets, exceeds, or falls below the predetermined continuous quoting requirements.

As described in greater detail below, various system components in the electronic trading system may be configured to store quotes and orders, monitor the trading patterns and compliance with continuous quoting parameters, adjust system order message transmission delays in response to quoting variances from the requirements, and manage messaging protocols to alert market-makers of quoting compliance issues that may affect protections from aggressive market participant trades against their quotes.

According to one embodiment of the present invention, the methods and systems described herein are integrated into a computerized financial trading system, such as computerized systems that are currently used by financial exchanges (e.g., Cboe Exchange Inc.). According to other embodiments of the present invention, the methods and systems described herein can be implemented utilizing computerized financial systems that are separate from systems that are currently used by financial exchanges or by utilizing a combination of financial exchange and non-financial exchange systems.

The various quote monitoring and timing modification features discussed above and herein may be implemented in a computer platform of the exchange system, alternatively referred to as a financial trading system. FIG. 1 shows a simplified block diagram that illustrates such a financial trading system 100. Each of the blocks of FIG. 1 can be implemented using a combination of computer hardware and software designed and implemented to achieve the functionality of each of the blocks. For example, member interface 106 as described in further detail below, may include special purpose software configured to accept financial exchange messages including constituent series orders/quotes from market participants through a communication port of a computer server connected to an electronic communication network (e.g., LAN or Internet) by one or more pieces of computer networking equipment (e.g., a switch) configured through software to receive and route the financial exchange messages to the appropriate destinations within the financial trading system 100.

The financial trading system 100 may include financial exchange components, as well as components that may be operated by non-exchange entities that access the financial exchange. Examples of financial exchange components are shown within the dashed lines 102. Components outside the dashed lines 102 are components that may be operated by non-exchange entities. Electronic communications within financial trading system 100 may be achieved using a variety of known mediums, including: local area networks (LANs), wide area networks (WANs), the Internet, etc.

The illustrated exchange components of the financial trading system 100 may include a computer implemented trading platform 104 (that includes, but is not limited to, a member interface 106, one or more matching engines 108, an electronic book 110 (which may be embedded within the matching engines 108), and a data output engine 114) and computer implemented exchange backend systems 116. Member interface 106 may provide an electronic interface for receiving trading messages (e.g., bids, offers, quotes, orders, and trading instructions for constituent series or other financial instruments) from one or more computing devices associated with one or more market participants including traders or other entities transacting business at the financial exchange. Member interface 106 may be implemented as a graphical user interface (GUI) and may include one or more software components operating on a computing device configured to perform trading functionality.

Member interface 106 may also be implemented to analyze electronic trading messages for proper format and information. If member interface 106 (or another financial exchange component) deems a trading message to have proper format and information, member interface 106 may route the eligible electronic trading messages to the appropriate matching engine 108 that manages the associated electronic book 110 where the result may be an order/quote entered into the respective book or an immediate match between a buyer and seller.

Additionally, the member interface 106 may include a latency adjuster 111 that implement changes to the latency, for example quote and order messaging delays (may also be referred to herein as speedbumps), on a market participant by market participant basis. The latency adjuster 111 may operate to implement or remove latency to an aggressive market participant's orders that access a specific market-maker's 122 quotes and orders when a trading pattern, such as one indicative of removing liquidity, is detected. The addition or removal of latency assists in preventing a specific market-maker 122 or other market participant from taking advantage of technology limitations of another market-maker 122. The application of the latency to the aggressive market participant's orders may be blanket latency added to any of the aggressive market-maker's orders, regardless of which market-maker quote the aggressive market participants would reduce liquidity from. Alternatively, the latency may be adjusted based on whether a market-maker 122, whose quote would be matched with the incoming order from the aggressive market participant, has unfulfilled continuous quoting obligations. In other words, the aggressive market participant may have its orders slowed down to a greater extent against market-maker quotes of market-makers who are meeting the continuous quoting obligations and to a lesser extent against market-maker quotes of market-makers failing to meet their continuous quoting obligations.

The latency adjuster 111 may be configured to monitor the quotes and quote patterns for market-makers on the electronic book, or receive information on quote patterns of market-makers from a different processor in the trading platform 104, in addition to making the adjustments to latency applied to messages from specific sources (e.g. specific market-makers).

Although there is no need for warnings or notices to affected parties regarding the application of an automated messaging delay in one embodiment, in alternative embodiments, the latency adjuster 111 may include an optional interface that automatically transmits warnings to market-makers when a delay is about to be applied to their quoting or other messaging, and automatically generates messages to affected market-makers regarding operations to remove latency restrictions that have been applied. The latency adjuster may also generate or transmit other latency change or duration information messages to the affected market-makers. In yet other alternative implementations, the latency adjuster 111 may periodically or continuously post or transmit latency data affecting any market-maker 122 for all market-makers to see.

The latency adjuster 111 is shown as part of the member interface 106 in the trading platform 104 in FIG. 1, but may be located in the matching engine 108 or be separate from either the member interface 106 or the matching engine 108 in other implementations. The latency adjuster 111 may be configured as a physical circuit with switchable delay paths, or utilize a software-implemented delay on a processor, in different implementations. Also, the latency adjuster 111 may selectively adjust specific market-maker, or specific other market participant, messages (including quote and order messages) based on any of a number of identification criteria. The identification criteria may include user ID numbers, IP address information, or other market participant specific identification or communication path information associated with a given quote or other order message arriving at the exchange systems 102. In yet other implementations, the latency adjuster 111 may be configured to identify a particular security or group of securities based on message identifiers. In this alternative implementation, the latency adjuster may be configured to introduce a latency in all trading of a particular security or group of securities regardless of the market participant source. The latency adjuster 111 may also be configured to identify both the market participant and the security to provide an even finer latency control where only trades of a specific security by a specific market participant would be subject to added latency. Further details about the functionality of the latency adjuster 111 in the trading system 100 are discussed in more detail below.

The trading platform 104 may include an application programming interface (API), which enables external systems to communicate with the member interface 106 and/or other components of exchange systems 102. The API may include programming instructions and standards that allow one or more market participants (e.g., market-maker 122, customer 124, member firm order routing system 126, etc.) to interface with the trading platform 104 via specially programmed computer code. For example, market-maker 122 may program software to connect to an API at trading platform 104. Once connected, market-maker 122 may enter orders/quotes into a specially programmed computer or have programs generate computer orders/quotes based on determined strategies. The entered or otherwise generated orders/quotes can be sent to the trading platform 104 via the API. Once received, the API can route the received orders/quotes to a processor associated with member interface 106 where a determination can be made as to whether the orders/quotes are eligible for entering into the electronic book 110 and/or execution. Eligible orders/quotes can be sent to the electronic book 110 and/or matching engine 108. Due to the large number of trading messages that are received every second, the API and/or member interface 106 should be configured to quickly and accurately process large amounts of data in short amounts of time.

In some embodiments, trading messages received via member interface 106 may be communicated to matching engine 108, which in turn may result in data being sent to external systems such as clearing systems 118 or member firm backend systems 120 via data feeds. In embodiments, data in data feeds may be categorized or otherwise grouped based on one or more attributes that are associated with a financial product. The attributes may include, for example, a product symbol, an opening price, a strike price, an expiration date, a quote, originator of the order or quote, a class, a bid, an ask, or any number of other attributes that can be used to group trading message data. Data having one or more similar attributes may be combined to form an input set. The formation of an input set, attribute grouping, or other categorization of data in the data feed may be performed by a processor at the data output engine 114 of the trading platform 104. The input sets may include all or part of the data in one or more trading messages in data feeds.

Matching engine 108 may provide an electronic mechanism for matching bids and offers that are submitted to the financial exchange by traders or other entities transacting business at the financial exchange. While financial trading system 100 shows a single matching engine 108, multiple matching engines may be included in a trading platform 104. Multiple matching engines may work independently or cooperatively depending on various factors related to the business of the financial exchange. For example, different exchange traded products (e.g., stocks, options, futures, etc.) may utilize different matching engines. The matching engine 108 may execute trades by pairing buy and sell orders. In some examples, non-marketable orders may be placed in an electronic book 110. Orders or quotes in electronic book (also referred to as the EBOOK) 110 may rest until they can be matched to a contra order or quote.

Matching engine 108 may update the electronic book 110 based on executed transactions. After a trade is executed, matching engine 108 may send information related to the executed trade to the data output engine 114. The data output engine 114 may send the received information to exchange backend systems 116, which may be used in the process of settling trades that have been executed at the financial exchange. Further, data output engine 114 may send information related to the executed trade to member firm backend systems 120. Member firm backend systems 120 may record or otherwise track an entity's executed transactions and/or those transactions that have yet to be executed.

The non-exchange components of financial trading system 100 can include clearing systems 118, member firm backend systems 120, and member firm order routing system 126; however, additional non-exchange components are also contemplated. Clearing systems 118 may be used in the process of settling trades that have been executed at the financial exchange. An example of a clearing corporation is The Options Clearing Corporation, which is an equity derivatives clearing organization. In some examples, the data output engine 114 may send a calculated value to the clearing systems 118 for use in settling one or more transactions. Member firm backend systems 120 may be used by the entities conducting business at the financial exchange to receive settlement information regarding their transactions. The received settlement information, which may include the value used in the settlement process, may be transmitted from exchange system 102 (e.g., data output engine 114) to member firm backend systems 120 via a communication mechanism. In embodiments, member firm backend systems 120 may include a storage device for storing the settlement information, a display device for displaying the settlement information, and/or any number of other components that can be used to facilitate the use of the settlement information.

The computer implemented trading platform 104 can be accessed in a variety of ways by entities conducting business at the financial exchange. For example, market-makers may access computer implemented trading platform 104 through market-maker computers 122 that are in electronic communication with the member interface 106 (or an API). Utilizing the market-maker computers 122, electronic trading messages (e.g., bids, offers, quotes, orders, trading instructions) may be sent to the computer implemented trading platform 104. Alternatively, the electronic trading messages may be routed through a member firm order routing system 126. The trading messages may include instructions for trading simple and/or complex orders. A simple order may include a single leg, while a complex order may include multiple legs that may be completed for a net price. One or more of the legs in the order may be for an index with a value that is determined using calculation engine 112 as described herein.

In further embodiments, a non-member entity wanting to transact business at the financial exchange can enter the non-member entity's trading instructions using a customer computer 124. Customer computer 124 may include one or more devices, such as a cellular telephone, smartphone, personal computer, laptop computer, tablet computer, or other mobile or fixed devices now known or later developed. The non-entity entered trading instructions may be routed through a member firm order routing system 126, which may transmit the electronic trading instructions to the member interface 106 (or an API). The trading instructions may be used to purchase one or more financial products whose value is determined using calculation engine 112.

The exchange backend systems 116 may perform a number of functions. For example, exchange backend systems 116 may perform operations related to contract definition and listing data. Additionally, exchange backend systems 116 may perform operations including one or more of (i) transmitting information regarding orders (including, but not limited to orders relating to index-based derivatives) to market data vendors 128; (ii) performing operations related to the performance of financial product upon which derivatives are based; (iii) determining appropriate contract settlement values; (iv) supplying final settlement data to the clearing systems 118 and the member firm backend systems 120; (v) etc.

Figure 2:
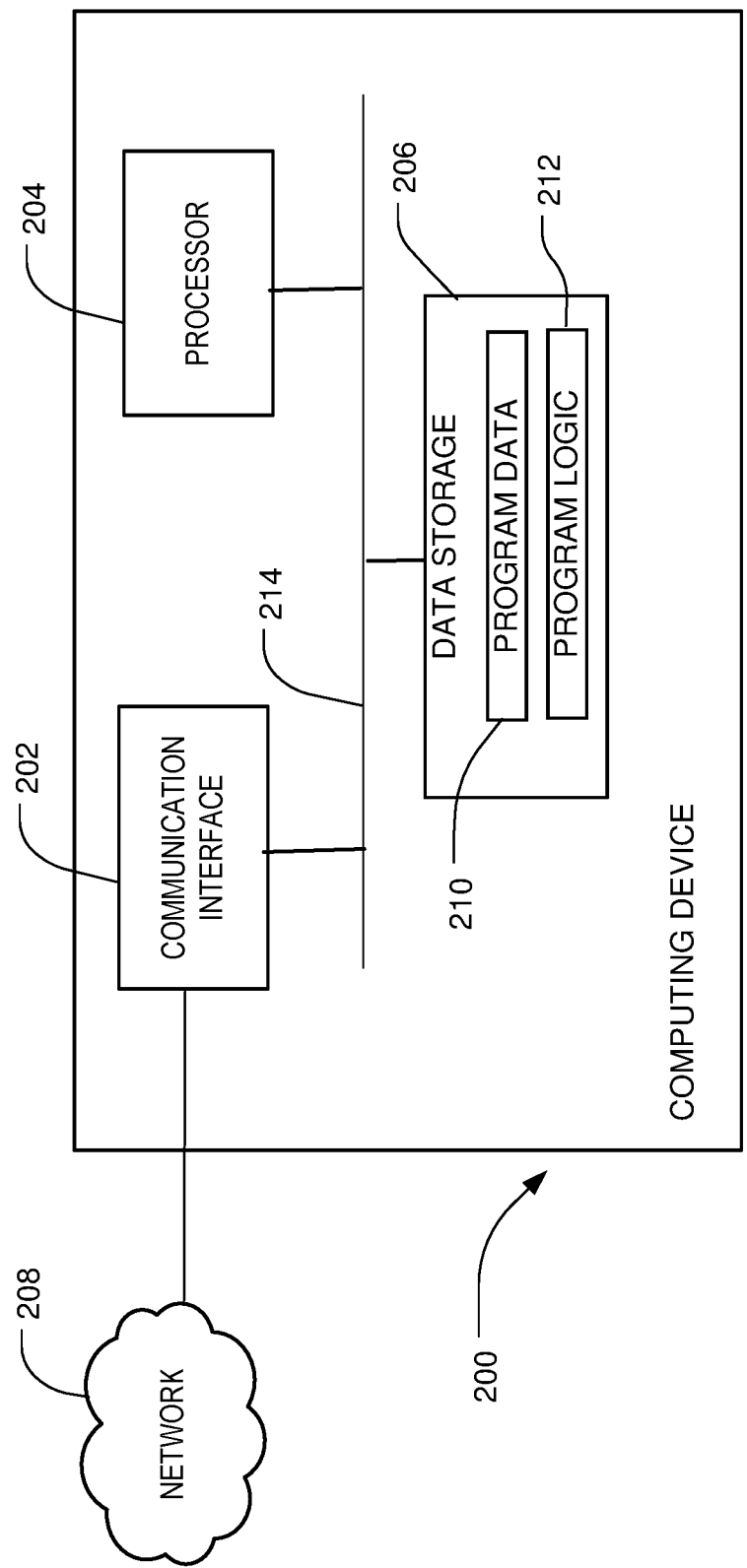
FIG. 2 is an illustrative example of an embodiment of a general computer system usable as one or more of the system components of FIG. 1.

FIG. 2 is a functional block diagram that illustrates a computing device 200 used in a trading platform 104 or exchange backend systems 116 such as illustrated in FIG. 1 in accordance with embodiments described herein. Computing device 200 may take a variety of forms. For example, computing device 200 may comprise or be arranged as a server, a computer, or other device or processing component that is now known or later developed, configured using proprietary software designed and implemented to achieve the functionality described herein.

As shown, computing device 200 may include a communication interface 202, a processor 204, and a data storage 206, all of which may be communicatively linked together by a system bus, network, or one or more other connection mechanisms 214. Although not shown, computing device 200 may also include other components, such as external storage, an input device operative to interact with the computing device, etc. It should also be understood that the configuration or functionality of computing device 200 may be distributed or subdivided between a plurality of entities, such as multiple computing devices. Further, it should be understood that some of the functions described herein may be carried out by an entity other than computing device 200.

In computing device 200, the communication interface 202 may comprise one or more structures, and associated equipment, for receiving data from one or more sources and distributing data to a group of one or more destinations. Communication interface 202 may be configured to receive input set data from one or more entities (such as matching engine 108 in FIG. 1) and store all or part of the input set data in data storage 206. Communication interface 202 may also be configured to communicate all or part of the input set data to data output engine 114 once the input sets are stored or otherwise processed.

Communication interface 202 may be configured to connect with a network 208, external media, a display, or any other components that may be present in a trading system (such as financial trading system 100 in FIG. 1). The connection with the network 208 (and/or components thereof) may be wired connection, a wireless connection, or combinations thereof. For example, the connection may be a physical connection, such as a wired Ethernet connection. In another example, the connection may be a wireless connection, such as a cellular telephone network, an 802.11, 802.16, 802.20 controls or components, a WiMax network, or any other type of network. Further, network 208 may be a public network, such as the Internet, a private network, such as an intranet, or combinations thereof, and may utilize a variety of networking protocols now available or later developed including, but not limited to TCP/IP based networking protocols.

Processor 204 may comprise one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. Processor 204 may carry out one or more instructions using one or more arithmetic, logical, and/or input/output operations. Though processor 204 is illustrated as a single component, processor 204 may be integrated in whole or in part with other components of computing device 200.

Data storage 206 may be a main memory, a static memory, or a dynamic memory. Data storage 206 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. In one case, data storage 206 may include a cache or random access memory for the processor 204. Data storage 206 may be separate from the processor 204, such as a cache memory of a processor, the system memory, or other memory. Data storage 206 may be an external storage device or database for storing data. Examples may include a hard drive, compact disc ("CD"), digital video disc ("DVD"), memory card, memory stick, universal serial bus ("USB") memory device, or any other device operative to store data.

As further shown, data storage 206 may include program data 210 and/or program logic 212. Program data 210 may include one or more types of data suitable for a given implementation. For example, program data 210 may include data (such as input sets) that may be stored in memory. Program logic 212 may include, for example, machine language instructions executable by processor 204 to carry out various functions, such as the functionality of the methods and systems described herein. In some examples, the functions, acts or tasks may be independent of the particular type of instructions sets, storage media, processor or processing strategy and may be performed by software, hardware, integrated circuits, firm-ware, microcode and the like, operating alone or in combination. Processing strategies may include multiprocessing, multitasking, parallel processing and the like.

Figure 3:
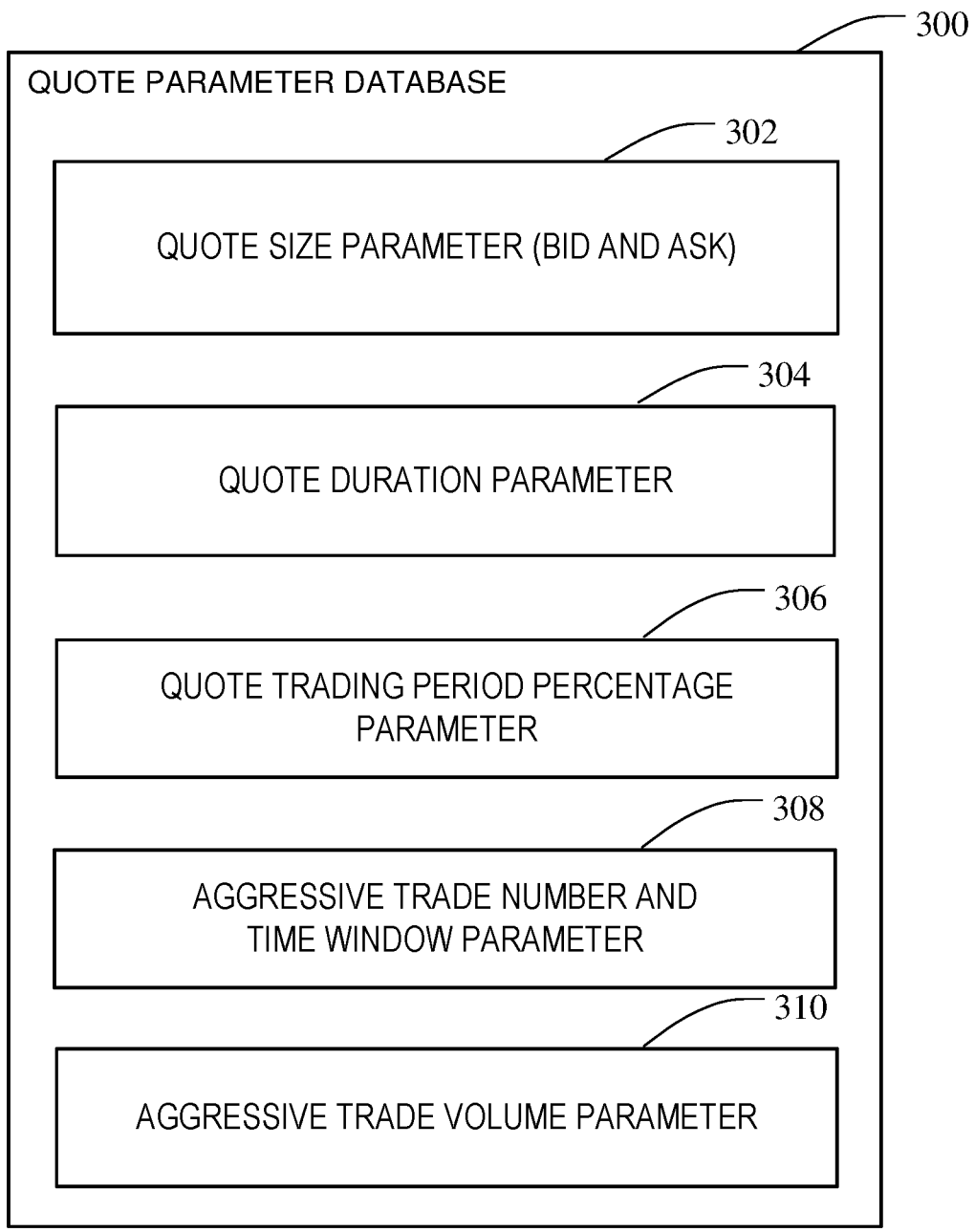
FIG. 3 illustrates an example of a financial exchange quote parameter database for use in the system of FIG. 1

Referring now to FIG. 3, an example quote parameter database 300 is shown. The quote parameter database 300 may include the parameters that the trading platform 104 contains and utilizes for determining if a quoting pattern of a market-maker is sufficient to maintain efficient order processing at the exchange system 100. For example, the quote parameter database 300 may include continuous quote obligation parameters for market-makers such as the quote size parameter 302 for each of the bid and ask portions of a two-sided quote. The quote parameter database 300 may also include a quote duration parameter 304 identifying a length of time that a quote must be maintained by a market-maker before the quote may be changed or withdrawn. Also, a quote trading period percentage parameter 306, identifying the percentage of time during a daily trading session and/or a set of trading sessions (week or month, for example) that market-maker quotes of minimum size must be maintained as available to trade against, may be included in the database 300.

With respect to the parameters that the trading platform 104 utilizes to determine who is engaging in trades as an aggressive market participant, these parameters may also be stored in the quote parameter database 300. The database 300 may include an aggressive trade number and time window parameter 308. The aggressive trade number and time window may be a threshold value or a chart. For example the "X" and the "Y" values of the previously mentioned X number of trades in Y amount of time that removes liquidity by immediately trading against current bids and offers. In one implementation, the Y value for time to decide whether trade activity illustrates an aggressive trade pattern may be defined as a set number of hours in a trading day, or in terms of one or more complete trading days, where any resultant latency/delay would be applied as a result of identifying aggressive trade behavior in that Y time period would be applied the following trading day. Meeting the aggressive trade number and time window parameters defines aggressive market participant status. Additionally, an aggressive trade volume parameter 310 may also be included that provides a minimum volume requirement in addition to the aggressive trade number and time window parameter 308 before the trading platform 104 identifies a market participant as an aggressive market participant.

Other market-maker quote requirements and aggressive market participant parameters may be included in the quote parameter database, including requirements that quotes on an underlying security have a difference not to exceed a predetermined amount between the bid and offer. In another embodiment, where the market for the underlying security is wider than the predetermined amount, the bid/ask differential may be as wide as the spread between the national best bid and offer (NBBO) in the underlying security. The quote parameter database 300 may be stored in one or more locations in the exchange systems 102, for example the trading platform 104, such as in the latency adjuster 111, the matching engine 108 or other component in the trading platform having a memory.

Figure 4:
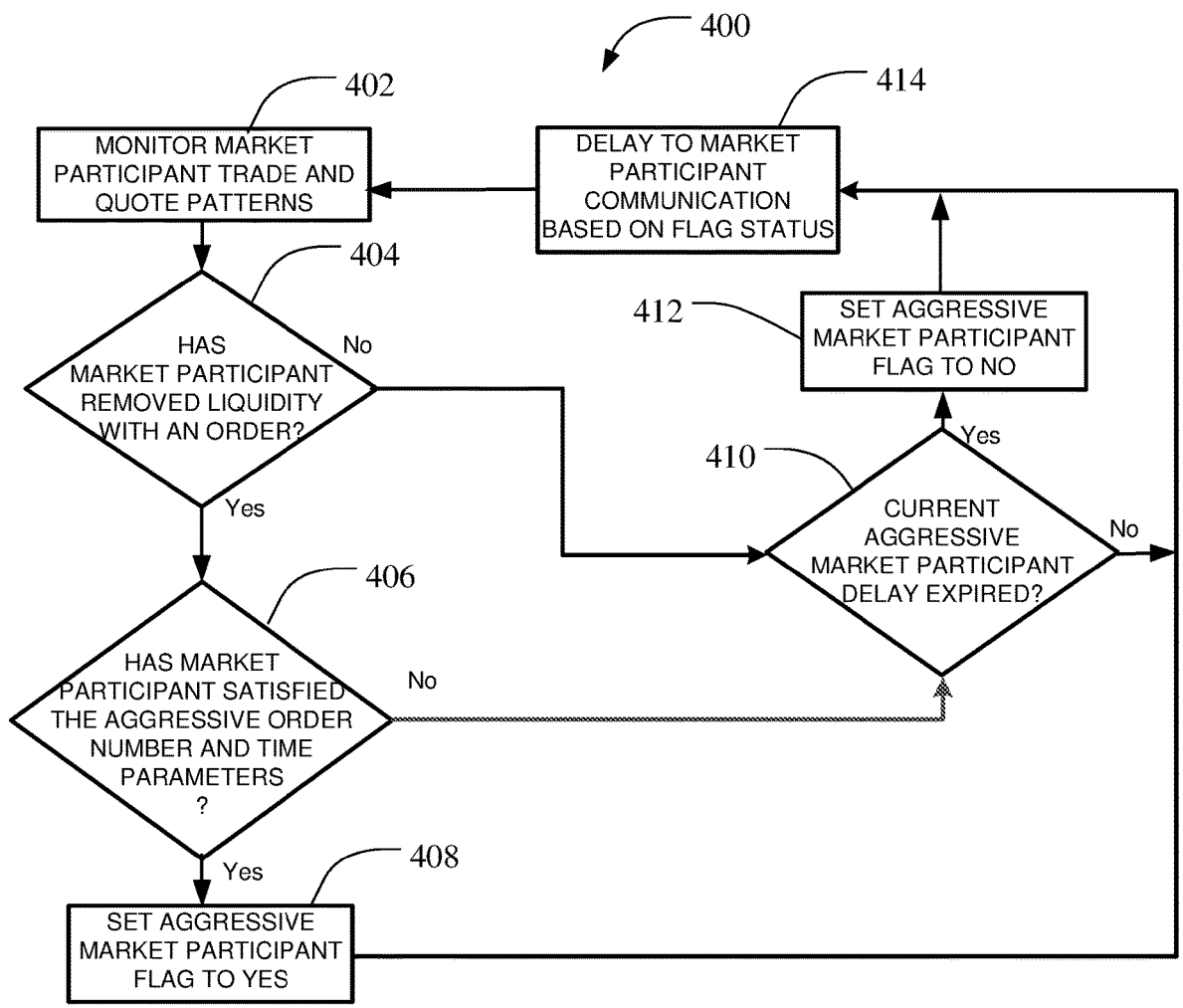
FIG. 4 is one implementation of a logic flow that a financial trading system may implement to perform message latency adjustment in response to resting market-maker quote patterns.

Utilizing the components of FIGS. 1-3, methods of managing latency in messaging or order execution based on patterns in order flow activity is illustrated in FIG. 4. The method 400 includes the trading platform 104 monitoring market participant trades and quotes (at 402). The quoting or trade activity of each market participant 122 may be monitored on a continuous or a periodic (e.g. hourly or daily) basis by the trading platform 104 analyzing order flow, such as the amount and timing of orders and the amount and duration quotes, via the matching engine 108 and/or the electronic book 110. The monitoring data maintained for each market participant may then be compared to the various parameters 302-310 retrieved from the quote parameter database 300. For example, trading platform 104 may first use the monitored market participant trade and quote pattern information to determine if liquidity has been removed with a recent trade (at 404). If that requirement has been satisfied, then the trading platform 104 would compare the monitored trade and quote pattern data to the aggressive market participant parameters, such as the aggressive order number and time duration parameter 308, to see if the parameter(s) have been satisfied (at 406). As noted above, the parameter for the number of liquidity removing orders and the span of time within which those liquidity removing orders have been made, may be fixed numbers, a predetermined chart with different combinations of qualifying number of liquidity removing orders and windows of time, or an algorithm.

If a monitored trade and quote pattern meets the requirements (at 406), then an aggressive market participant flag associated with the particular market participant is set to "YES", as the market participant has been determined to be an aggressive market participant (at 408). The latency adjuster 111 then recognizes the flag and applies a predetermined delay to all messages and orders from the aggressive market participant. The delay may be a fixed amount, such as 5 milliseconds, that is applied to all aggressive market participants, or may be a staggered or variable time delay customized to the severity of the aggressive market participant's actions. In one implementation, the time delay may be increased from a default delay amount for aggressive market participants that have been identified as aggressive more than one time in a given time period, for example more than one determination in a trading day or a trading week. In another implementation, the latency or delay may not only apply to messages and orders from an identified aggressive market participant, but also to messages and orders directed to the identified aggressive market participant.

If the parameters have not been met, then the aggressive market participant flag is not changed. If the market participant is already associated with a currently active aggressive market participant flag from earlier aggressive behavior, then the flag is examined to determine if the flag, and the associated messaging delay applied to the market participant's message has yet expired (at 410). If the flag has not expired, then the latency adjuster 111 delays the market participant's removal of liquidity and order processing by a predetermined amount according the flag setting. In one non-limiting embodiment, the delay may be a 1 millisecond delay applied to the market participant's communications for a trading day, or for the period of time until a next calculation of an aggressive market participant flag is completed. If the flag has expired, then the flag is reset to "NO" (at 410, 412) and the latency adjuster 111 then will remove any communication delay on liquidity removal messages if a delay has previously been applied to that market participant's messaging, such as quotes and/or orders, or will make no change to the latency setting for that market-maker if no prior latency had been imposed (at 414). In different embodiments, the delay may be added to only outgoing messages or orders from the identified market participant, to only incoming messages or orders for the identified market participant, or to some or all of any message or order to or from the identified market participant.

The delay added to the removing of orders or quotes may be a fixed delay of a predetermined amount of time (e.g., 5 milliseconds). In alternative implementations, the delays applied may be randomized within a certain delay range for each message to allow for a randomized window of delays. In yet other alternatives, the delay may be a fixed delay, but scaled at the time it is imposed by the severity of the variance of the market participant's order or quoting pattern from the quoting parameters maintained in the continuous quoting parameter database 300. For example, the delay imposed may be a first delay amount (or range) per message if one parameter, such as the aggressive trade number an time window parameter 308 is satisfied, and a second delay (or range) that is greater than first when another parameter, such as the aggressive trade volume parameter 310 is also satisfied.

Similarly, separately from, or in combination with, imposing a latency on communications based on the number of different aggressive quoting parameters 308, 310 that have been met by a market participant's trading patterns, the amount of the market participant's divergence from each parameter may affect the fixed delay (or delay range) applied when the delay is set (at 414). As one example, if the market participant's trading pattern diverges from the aggressive trade number and time window parameter 308 by less than or equal to a first percentage, the speedbump or latency would be set to a first amount, while a divergence of greater than the first percentage would result in a greater latency penalty being applied to that market participant's order and quote messages.

Figure 5:
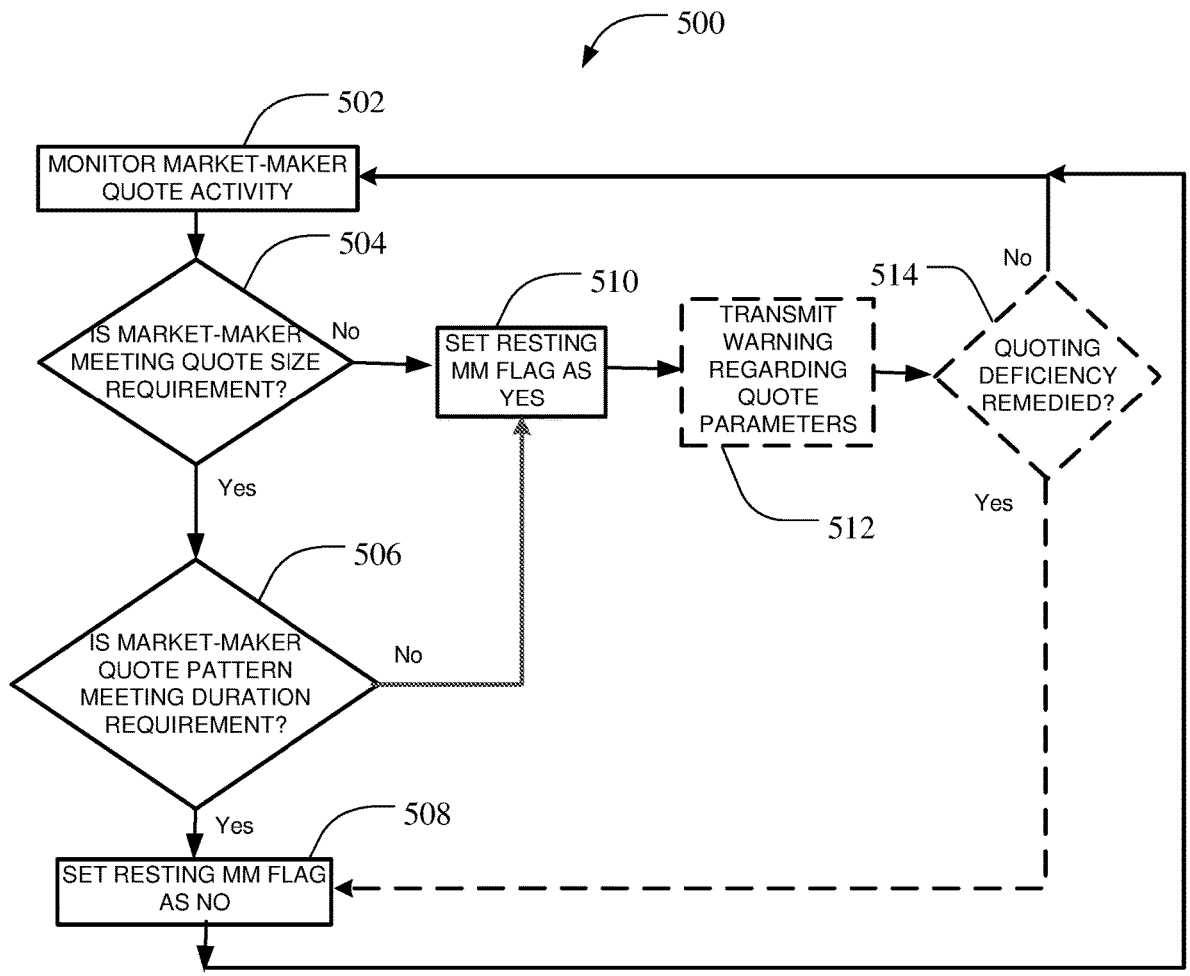
FIG. 5 is a logic flow for generating a resting market-maker flag that may be used in the logic flow of FIG. 4.

In an alternate embodiment, as illustrated in FIG. 5, the trading platform 104 may also control the delay of removal of liquidity by an aggressive market participant based on whether the market-maker whose liquidity is being taken has met their continuous quoting obligation. Instead of simply changing the latency of an aggressive market participant's messages based on the status of an aggressive market participant flag alone (see 414, FIG. 4), a second, resting market-maker, flag may also be considered at step 414 of FIG. 4 to account for the resting market-maker status of the market-maker that the aggressive market-maker's next order would match with. The latency adjuster 111 may then modify the amount of latency applied to an aggressive market participant's order in view of the target market-maker's compliance pattern. FIG. 5 illustrates one embodiment of a logic process the trading platform 104 may engage in to monitor continuous quoting obligation compliance of market-makers, and to then assign a value (e.g. YES or NO) to a resting market-maker flag associated with each market-maker 122. As used herein, the term resting market-maker refers to a market-maker that is not engaging in a quoting pattern commensurate with exchange parameters, such as those in the quote parameter database 300, and is therefore considered to be "resting."

The monitoring of market-makers 122 may be continuous or periodic (at 502). If either of the quote size requirement or the quoting pattern duration requirements in the quote parameter database 300 has not been satisfied based on the processor-initiated comparison (at 504, 506) in the trading platform 104, then the processor will set a resting market-maker flag to "YES" (at 510).

After a market-maker 122 has been determined to be out of compliance with the continuous quoting parameter(s) being monitored (at 504, 506), and the warning has been transmitted (at 512), the resting market-maker flag that has been set to YES automatically trigger a modification of any a communication delay by the latency adjuster 111 on subsequent quote and order communications originating from an aggressive market participant and directed to that resting market-maker (see FIG. 4, at 414).

In one embodiment, the trading platform 104, may optionally send a notification message to the affected market-maker 122 to alert them to the fact that a continuous quoting requirement parameter has not been met (at 512). The warning message to the market-maker may be sent only to the affected market-maker 122 in one implementation, or may be transmitted to all market-makers and not just the affected market-maker 122 in other implementations. The warning message may be sent via the member interface 106 or through a market data feed via the market data vendor network 128 of the exchange systems 102. In another embodiment, rather than simply notify a market-maker 122 that they are considered a resting market-maker, the latency adjuster 111 may include in the warning message a grace period within which the affected market-maker 122 may attempt to make up for the deficiencies found. If the quoting deficiency is remedied in the grace period (at 514), then the resting MM flag may be set to "NO" (at 508) and that market-maker's communications may avoid being potentially subjected to different speed bump protection from an aggressive market participant (see FIG. 4 at 414). If the quoting deficiency is not remedied, then the latency adjuster 111 may consider the resting market-maker status as part of its determination on how much to delay an aggressive market participant's order.

A system and method for managing latency of messages in an electronic exchange is described above. To maintain an orderly and efficient electronic marketplace, liquidity is necessary and certain entities in an exchange are tasked to maintain continuous two-sided quotes so that other market participants always have a market in a particular financial instrument and do not experience unnecessary delays or the inability to execute trades altogether. Automatically monitoring quote patterns of market participants and comparing those patterns against exchange system parameters allows the exchange to selectively and automatically implement latency changes. The latency changes may include delays added to liquidity removing orders to avoid aggressive market participants from removing too much liquidity, and for promoting and protecting compliance from market-makers with two-sided quoting needs to maintain an orderly market.

It is intended that the foregoing detailed description be regarded as illustrative rather than limiting, and that it be understood that it is the following claims, including all equivalents, that are intended to define the spirit and scope of this invention.

We claim:

1. A computer-implemented method adjusting messaging latency in an electronic exchange system, the method comprising:

in a processor of the electronic exchange system:
monitoring a quote pattern related to at least one of a security or a group of securities in the electronic exchange system;
comparing the quote pattern to one or more quote pattern parameters stored in a memory of the electronic exchange system, wherein the quote pattern comprises a predetermined number of received liquidity removing orders related to the at least one of the security or the group of securities that are received over a predetermined window of time, and wherein the one or more quote pattern parameters comprise a threshold number of liquidity removing orders related to the at least one of the security or the group of securities received within a window of time;

in response to the quote pattern satisfying the one or more quote pattern parameters:

applying a message delay to subsequent incoming messages related to the at least one of the security or the group of securities; and continuing application of the message delay to subsequent incoming messages related to the at least one of the security or the group of securities until expiration of a communication delay period.

2. The computer-implemented method of claim 1, wherein comparing the quote pattern to one or more quote pattern parameters comprises:

comparing the quote pattern to a plurality of quote parameters, where the plurality of quote pattern parameters further comprises a volume of liquidity removed by orders related to the at least one of the security or the group of securities.

3. The computer-implemented method of claim 1, wherein the message delay comprises a fixed period of time.

4. The computer-implemented method of claim 1, wherein the message delay comprises a randomly selected time in a predetermined fixed delay range.

5. The computer-implemented method of claim 1, further comprising:

in response to the quote pattern failing to satisfy the quote pattern parameter, the processor transmits a warning message to at least one market-maker regarding non-compliance with the quote parameter.

6. The computer-implemented method of claim 1, further comprising:

adjusting an amount of the message delay applied to incoming messages related to the at least one of the security or the group of securities based on an amount of divergence from the threshold number of liquidity removing orders related to the at least one of the security or the group of securities within the window of time in the monitored quote pattern.

7. The computer-implemented method of claim 1, further comprising:

in response to the quote pattern satisfying the one or more quote pattern parameters, applying the message delay to both incoming messages related to the at least one of the security or the group of securities and outgoing messages related to the at least one of the security or the group of securities.

8. An exchange system for managing latency of messages, the exchange system comprising:

a communication interface configured to identify messages related to at least one of a security or a group of securities;

a processor in communication with the communication interface; and a memory comprising processor-executable instructions that when executed by the processor cause the processor to:

monitor quote patterns related to the at least one of the security or the group of securities in the electronic exchange system;

compare the quote patterns to one or more quote pattern parameters stored in a memory of the electronic exchange system, wherein the quote patterns comprises a predetermined number of received liquidity removing orders related to the at least one of the security or the group of securities that are received over a predetermined window of time, and wherein the one or more quote pattern parameters comprise a threshold number of liquidity removing orders related to the at least one of the security or the group of securities received within a window of time; and in response to the quote pattern satisfying an aggressive quote pattern parameter, wherein satisfying the aggressive quote pattern comprises exceeding the threshold number of liquidity removing orders related to the at least one of the security or the group of securities received within the window of time:

apply a latency to subsequent messages related to the at least one of the security or the group of securities; and maintain application of the latency to messages related to the at least one of the security or the group of securities for a predetermined latency application period.

9. The exchange system of claim 8, wherein the processor-executable instructions are further configured to cause the processor to compare the quote pattern to a plurality of quote pattern parameters, where the plurality of quote pattern parameters comprises a volume of liquidity removed by removal orders related to the at least one of the security or the group of securities.

10. The exchange system of claim 8, wherein the latency applied to each of the subsequent messages message comprises a fixed period of time.

11. The exchange system of claim 8, wherein the latency applied to each subsequent message comprises a randomly selected time in a predetermined fixed delay range.

* * * * *